(12) United States Patent
Sutovich et al.

(10) Patent No.: US 9,993,810 B2
(45) Date of Patent: *Jun. 12, 2018

(54) SILICA SOL BOUND CATALYTIC CRACKING CATALYST STABILIZED WITH MAGNESIUM

(71) Applicant: W. R. GRACE & CO.-CONN., Columbia, MD (US)

(72) Inventors: Kevin J. Sutovich, Hampstead, MD (US); Wu-Cheng Cheng, Ellicott City, MD (US); Ranjit Kumar, Clarksville, MD (US); Michael S. Ziebarth, Columbia, MD (US); Yuying Shu, Ellicott City, MD (US)

(73) Assignee: W. R. GRACE & CO.-CONN, Columbia, MD (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/948,641

(22) Filed: Jul. 23, 2013

(65) Prior Publication Data
US 2014/0021097 A1   Jan. 23, 2014

Related U.S. Application Data

(60) Provisional application No. 61/674,535, filed on Jul. 23, 2012.

(51) Int. Cl.

| | | |
|---|---|---|
| *B01J 29/08* | (2006.01) | |
| *C10G 11/05* | (2006.01) | |
| *C10G 11/18* | (2006.01) | |
| *B01J 21/10* | (2006.01) | |
| *B01J 29/90* | (2006.01) | |
| *B01J 35/10* | (2006.01) | |

(52) U.S. Cl.
CPC ............ *B01J 29/084* (2013.01); *B01J 21/10* (2013.01); *B01J 29/08* (2013.01); *B01J 29/90* (2013.01); *B01J 35/1014* (2013.01); *C10G 11/05* (2013.01); *C10G 11/18* (2013.01); *B01J 2229/186* (2013.01); *B01J 2229/20* (2013.01); *B01J 2229/42* (2013.01)

(58) Field of Classification Search
CPC ... B01J 29/084; B01J 2229/20; B01J 2229/42
See application file for complete search history.

(56) References Cited

U.S. PATENT DOCUMENTS

| | | | |
|---|---|---|---|
| 2,971,903 A | 2/1961 | Kimberlin, Jr. et al. ...... | 208/119 |
| 3,140,249 A | 7/1964 | Plank et al. .................. | 208/120 |
| 3,236,762 A | 2/1966 | Rabo et al. .................. | 208/111 |
| 3,293,192 A | 12/1966 | Maher et al. ................. | 252/430 |
| 3,364,135 A | 1/1968 | Hansford et al. ............ | 208/120 |
| 3,410,808 A | 11/1968 | Smith et al. ................. | 252/453 |
| 3,413,238 A | 11/1968 | Gladrow et al. ............. | 252/455 |
| 3,429,830 A | 2/1969 | Ward ............................ | 252/453 |
| 3,446,727 A | 5/1969 | Secor ............................ | 208/120 |
| 3,449,070 A | 6/1969 | McDaniel et al. ............ | 23/111 |
| 3,449,265 A | 6/1969 | Gladrow et al. ............. | 252/455 |
| 3,459,679 A | 8/1969 | Plank et al. .................. | 252/455 |
| 3,835,031 A | 9/1974 | Bertolacini et al. .......... | 208/120 |
| 3,867,308 A | 2/1975 | Elliott, Jr. .................... | 252/455 |
| 3,957,689 A | 5/1976 | Ostermaier et al. .......... | 252/455 |
| 4,153,535 A | 5/1979 | Vasalos et al. ............... | 208/120 |
| 4,240,899 A | 12/1980 | Gladrow et al. ............. | 208/120 |
| 4,376,696 A | 3/1983 | Myers .......................... | 208/120 |
| 4,458,023 A | 7/1984 | Welsh et al. .................. | 502/65 |
| 4,465,588 A | 8/1984 | Occelli et al. ................ | 208/120 |
| 4,465,779 A | 8/1984 | Occelli et al. | |
| 4,515,902 A | 5/1985 | Shioiri et al. .................. | 502/64 |
| 4,542,118 A | 9/1985 | Nozemack et al. ............ | 502/65 |
| 4,556,478 A | 12/1985 | Shioiri et al. ................. | 208/120 |
| 4,874,729 A | 10/1989 | Klazinga ........................ | 502/61 |
| 4,874,730 A | 10/1989 | Klazinga ........................ | 502/61 |
| 4,918,036 A * | 4/1990 | Rheaume et al. .............. | 502/66 |
| 4,944,865 A | 7/1990 | Occelli et al. ................ | 208/121 |
| 5,034,362 A | 7/1991 | Chu et al. ....................... | 502/60 |
| 5,141,624 A | 8/1992 | Liao et al. .................... | 208/113 |
| 5,173,463 A | 12/1992 | Macedo .......................... | 502/68 |
| 5,286,370 A | 2/1994 | Chu et al. ..................... | 208/120 |
| 5,358,917 A | 10/1994 | Van Veen et al. .............. | 502/66 |
| 5,601,798 A | 2/1997 | Cooper et al. ................ | 423/700 |
| 5,646,082 A | 7/1997 | Tan-no et al. .................. | 502/65 |
| 5,705,142 A | 1/1998 | Tan-no et al. ................. | 423/700 |
| 5,997,729 A | 12/1999 | Itoh ................................ | 208/120 |
| 6,045,687 A | 4/2000 | Mignard et al. ............ | 208/111.3 |
| 6,114,267 A | 9/2000 | Ghosh et al. ................... | 502/68 |
| 6,143,057 A | 11/2000 | Bulow et al. ..................... | 95/96 |
| 6,159,887 A | 12/2000 | Trujillo et al. ................. | 502/64 |
| 6,214,211 B1 | 4/2001 | Itoh ................................ | 208/118 |
| 6,399,530 B1 | 6/2002 | Chen .............................. | 502/64 |
| 6,511,933 B1 | 1/2003 | Shibasaki et al. .............. | 502/64 |
| 6,528,447 B1 | 3/2003 | Ghosh et al. .................. | 502/65 |
| 6,716,338 B2 | 4/2004 | Madon et al. ........... | 208/120.01 |
| 6,858,555 B2 | 2/2005 | Shibasaki et al. .............. | 502/64 |
| 6,930,067 B2 | 8/2005 | O'Connor et al. ............. | 502/64 |
| 6,942,783 B2 | 9/2005 | Xu et al. .................. | 208/120.01 |
| 7,033,487 B2 | 4/2006 | O'Connor et al. ...... | 208/120.01 |
| 7,776,775 B2 | 8/2010 | Du et al. ........................ | 502/65 |
| 2003/0089640 A1 | 5/2003 | Madon et al. ................ | 208/122 |
| 2003/0173254 A1 | 9/2003 | Chen et al. ............. | 208/120.01 |
| 2005/0271582 A1 | 12/2005 | Barea et al. .................. | 423/709 |
| 2010/0236983 A1 | 9/2010 | Watanabe ................ | 208/120.15 |
| 2010/0252484 A1* | 10/2010 | Kumar et al. ........... | 208/120.15 |
| 2014/0021098 A1 | 1/2014 | Kumar et al. ........... | 208/120.25 |

FOREIGN PATENT DOCUMENTS

CA    967136    5/1975 ..................... 252/60

OTHER PUBLICATIONS

Sadeghbeigi, Fluid Catalytic Cracking Handbook, Gulf Publ. Co. Houston, 1995, ISBN 0-88415-290-1.
Venuto and Habib, "Fluid Catalytic Cracking with Zeolite Catalysts," Marcel Dekker, New York 1979, ISBN 0-8247-6870-1.

* cited by examiner

*Primary Examiner* — Renee Robinson
(74) *Attorney, Agent, or Firm* — Charles A. Cross; Beverly J. Artale

(57) ABSTRACT

A rare earth free particulate catalytic cracking catalyst which comprises a zeolite having catalytic cracking ability under catalytic cracking conditions, an acidified silica sol binder, magnesium salt, clay and a matrix material. The catalytic cracking catalyst has a high matrix surface area and is useful in a catalytic cracking process, in particularly, a fluid catalytic cracking process, to provide increased catalytic activity and improved hydrogen and coke selectivity without the need to incorporate rare earth metals.

26 Claims, No Drawings

SILICA SOL BOUND CATALYTIC CRACKING CATALYST STABILIZED WITH MAGNESIUM

CROSS-RERENCE TO RELATED APPLICATIONS

This application claims the benefit of the filing date of U.S. Provisional Patent Application No. 61/674,535 filed Jul. 23, 2012, the disclosure of which is hereby incorporated by reference.

FIELD OF THE INVENTION

The present invention relates to novel magnesium and silica containing high matrix surface area catalytic cracking catalysts having high catalytic activity and good selectivity for coke and hydrogen, the process of preparing the catalysts, and the process of using the catalysts during a catalytic cracking process.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 50 to about 150 µm, preferably from about 50 to about 100 µm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracking products as well as lighter gaseous vaporous cracking products of four or less carbon atoms per molecule. The vapor partly consists of olefins and partly of saturated hydrocarbons. The products also include bottoms and coke deposited on the catalyst during hydrocarbon cracking. It is desirable to produce the lowest bottoms at a constant coke level.

FCC catalysts normally consist of a range of extremely small spherical particles. Commercial grades normally have average particle sizes ranging from about 45 to 150 µm, preferably from about 55 to about 150 µm. FCC catalysts are generally composed of zeolite, matrix, clay and binder. The cracking catalysts may be comprised of a number of components incorporated into a single particle or may be comprised of blends of individual particles having different functions.

Rare earth metals have been widely used as a component of FCC catalyst to provide catalysts having enhanced activity and hydrothermal zeolite stability with increased yield performance. The level of rare earth metals in a specific catalyst formulation is determined by operational severity and product objectives. However, the need for increased amounts of gasoline and the need to process heavy crudes containing high metal contents have led to an increase in the level of rare earths in their FCC catalyst formulations over time. The amount of rare earth metal typically used in the FCC catalyst ranges from about 0.5 to about 6 wt % of the total FCC catalyst formulations.

Recently, China, which produces 95% of the world's supply of rare earth metals, has severely cut its export of precious rare earth metals, causing a troubling increase in catalyst costs. The refining industry has instinctively reacted by opting for lower rare earth catalyst formulations to offset costs of the raw materials. Such action offers immediate and successful cost savings. However, reduced rare earth levels can have a significant impact on catalyst performance, e.g. in reduced catalyst activity, stability and yields, thereby affecting bottom-line profit generation.

Consequently, there exists a need in the FCC refining industry for rare earth free catalytic cracking catalysts that provide a catalytic activity and selectivity comparable to or improved over conventional rare earth containing FCC catalysts during a catalytic cracking process.

SUMMARY OF THE INVENTION

The present invention encompasses the discovery that the combination of an acidified silica sol binder and a magnesium salt in certain catalytic cracking catalyst compositions, in particular high matrix surface area FCC catalyst compositions, are very effective to provide compositions having increased catalytic activity and improved coke and hydrogen selectivity without the need to incorporate rare earth metals. Catalytic cracking catalysts of the invention advantageously offer increased cost savings while providing enhanced catalyst activity and selectivity comparable to catalyst activity and selectivity obtainable using conventional rare earth containing zeolite based FCC catalysts.

Catalyst compositions in accordance with the present invention generally comprise at least one zeolite component having catalytic cracking activity under FCC conditions, magnesium salt, clay, an acidified silica sol binder and a matrix material. The catalyst compositions have a high matrix surface area, e.g. greater than 60 $m^2/g$.

In accordance with the present invention, the catalyst compositions of the invention are prepared by a process comprising spray drying an aqueous slurry comprising at least one zeolite component having catalytic cracking activity under FCC conditions, clay, an acidified silica sol binder and a matrix material in an amount sufficient to produce catalyst particles. The catalyst particles are thereafter washed with an aqueous solution to remove sodium and sulfate ions. The washed catalyst particles may optionally be calcined. The resulting catalyst particles are treated with an aqueous solution of a magnesium salt in an amount sufficient to provide final catalyst particles having a desired amount of magnesium salt distributed throughout its pore volume. Typically, the final catalyst particles have a Davison Index (DI) of less than 30.

Accordingly, it is an advantage of the present invention to provide an acidified silica sol bound high matrix surface area FCC catalyst composition stabilized with a magnesium salt, which catalysts have high activity and hydrothermal stability during an FCC process.

It is also an advantage of the present invention to provide an acidified silica sol bound high matrix surface area FCC catalyst compositions which are free of rare earth metals and have high activity and hydrothermal stability during a FCC process.

Another advantage of the present invention is to provide an acidified silica sol bound high matrix surface area FCC catalyst compositions which are stabilized with a magnesium salt and which exhibit high catalytic activity and good coke and hydrogen selectivity during a FCC process.

It is further an advantage of the present invention to provide a process for preparing the magnesium stabilized acidified silica sol bound FCC catalysts of the invention.

It is yet another advantage of the present invention to provide improved FCC processes using compositions and processes in accordance with the present invention.

These and other aspects of the present invention are described in further details below.

DETAILED DESCRIPTION OF THE INVENTION

For purposes of this invention the terms "rare earth" and "rare earth metal" are used herein interchangeably to designate metals of the Lanthanide Series of The Periodic Table, and yttrium.

The term "free" as it relates to an amount of rare earth or rare earth metal is used herein to indicate less than 0.3 wt % of rare earth, measured as the oxide, based on the total weight of the composition.

The phrase "catalytic cracking activity" is used herein to indicate the ability of a compound to catalyze the conversion of hydrocarbons to lower molecular weight compounds under catalytic cracking conditions.

The phrase "catalytic cracking conditions" is used herein to indicate the conditions of a typical catalytic cracking process, in particularly an FCC process wherein a circulating inventory of cracking catalyst is contacted with a heavy hydrocarbon feedstock at elevated temperature, e.g. a temperature ranging from about 480° C. to about 700° C., to convert the feedstock into lower molecular weight compounds.

Catalyst compositions of the invention typically comprise particulate compositions comprising at least one zeolite component having catalytic cracking activity under FCC conditions, clay, an acidified silica sol binder and a matrix material. The particulate catalyst compositions have been treated with magnesium salt, expressed as the oxide, to give a final high matrix surface area catalytic cracking catalyst.

The zeolite component useful to prepare the particulate compositions of the invention may be any zeolite which has catalytic cracking activity under FCC conditions and which is free or substantially free of rare earth metal containing compounds. Typically the zeolitic component is a synthetic faujasite zeolite. In a preferred embodiment of the invention, the zeolite component is Y-type zeolite, such as USY. It is also contemplated that the zeolite component may comprise a mixture of zeolites such as synthetic faujasite in combination with mordenite and the ZSM type zeolites. Generally, the zeolite component comprises from about 10 wt % to about 50 wt % of the cracking catalyst. In one embodiment of the invention, the zeolite component comprises from about 12 wt % to about 40 wt % of the catalyst composition. In another embodiment of the invention, the zeolite component comprise from about 15 wt % to about 35 wt % of the catalyst composition.

In one embodiment of the invention, the zeolite component in the final catalyst composition has a $Na_2O$ content of less than about 1.2 wt %, preferably less than about 0.8 wt %, most preferably less than about 0.5 wt %, based on the total weight of the zeolite component.

Catalysts of the invention are bound with an acidified silica sol binder. Generally, the acidified silica sol binder is a mineral acid soluble metal silicate such as disclosed and described in U.S. Pat. Nos. 3,957,689 and 3,867,308. Typically, the acidified silica sol binder is prepared by rapid addition of a mineral acid, e.g. sulfuric acid, and the like, to a soluble metal silicate, e.g. sodium silicate, and the like, to form a hydrosol while adjusting the pH of the sol in the range of 1 to 3.5. Preferably, the pH is adjusted in the range of 2 to 3.2. In a preferred embodiment of the invention, the soluble metal silicate is sodium silicate and the mineral acid is sulfuric acid. It is also with the scope of the invention that the mineral acid may contain a buffering agent, such as aluminate sulfate and the like, to improve the stability of the resulting sol.

Generally, the amount of binder material present in the particulate catalyst compositions of the present invention comprises from about 5 wt % to about 30 wt %, preferably from about 10 wt % to about 25 wt %, most preferably from about 12 wt % to about 20 wt %, based on the total weight of the catalyst composition.

The invention catalyst further includes a clay component. While kaolin is the preferred clay component, it is also contemplated that other clays, such as modified kaolin (e.g. metakaolin) may be optionally included in the invention catalyst. The clay component will typically comprise from about 5 wt % to about 65 wt % of the total weight of the catalyst composition. In a preferred embodiment of the invention, the amount of the clay component ranges from about 25 wt % to about 55 wt % of the total weight of the catalyst composition.

Catalyst compositions of the invention comprise at least one or more matrix material. Suitable matrix materials include, but are not limited to a material selected from the group consisting of alumina, silica-alumina, zirconia, titania, and combinations thereof. In a preferred embodiment, the matrix material is alumina. The matrix material may be present in the invention catalyst in an amount ranging from about 1 wt % to about 70 wt % of the total catalyst compositions. In one embodiment of the invention, the matrix material comprises from about 5 wt % to about 50 wt % of the total catalyst composition.

Compositions of the invention have a high matrix surface area, that is, the catalyst compositions have a matrix surface area of greater than 60 $m^2/g$. In one embodiment of the invention, the matrix surface area is greater than 80 $m^2/g$. In another embodiment of the invention, the matrix surface area is greater than 90 $m^2/g$.

The particle size and attrition properties of the invention catalyst affect fluidization properties in the catalytic cracking unit and determine how well the catalyst is retained in the commercial unit, especially in an FCC unit. The catalyst composition of the invention typically has a mean particle size of about 45 μm to about 200 μm. In a preferred embodiment of the invention, the catalyst composition has a mean particle size of about 55 μm to about 150 μm.

Catalyst compositions in accordance with the present invention have good attrition properties as indicated by a Davison Index (DI) of less than 30. In a preferred embodiment of the invention, the catalyst compositions have a DI of less than 20. In a more preferred embodiment of the invention, the catalyst compositions have a DI of less than 15.

Catalyst compositions of the invention may be formed by any conventional method heretofore used in the catalyst art to form particulate FCC catalyst compositions. Generally, catalyst compositions of the invention are prepared by forming a homogeneous or substantially homogeneous aqueous slurry which contains a catalytically active zeolite component, an acidified silica sol binder, clay, and at least one matrix material in an amount sufficient to provide a final catalyst composition which comprises about 10 to about 50 wt % of the catalytically active zeolite component, about 5 wt % to about 30 wt % of silica sol binder, from about 5 wt % to about 65 wt % of clay, and about 1 wt % to 70 wt % of matrix material, said weight percentages being based on the total catalyst composition.

In a preferred embodiment of the invention, the aqueous slurry of zeolite and matrix and optionally clay is milled to obtain a homogeneous or substantially homogeneous slurry, i.e. a slurry wherein all the solid components of the slurry have an average particle size of less than 10 μm. Alternatively, components forming the slurry may be milled prior to forming the slurry. The aqueous slurry is thereafter mixed with an acidified silica sol binder and optionally clay to obtain a homogeneous or substantially homogeneous aqueous slurry.

The aqueous slurry is thereafter subjected to a spray drying step using conventional spray drying techniques to form catalyst particles. The catalyst particles are thereafter washed in an aqueous solution to remove ions, i.e. sodium and sulfates ions. In a preferred embodiment of the invention, the aqueous wash solution contains ammonia and or salts of ammonia.

Subsequently, the catalyst particles are treated with a magnesium salt in a manner sufficient to distribute the magnesium salt throughout the catalyst particles. Magnesium salts useful in the present invention include any soluble magnesium salt which is capable of forming a solution in an appropriate solvent which may be removed readily in a subsequent drying step. In a preferred the solvent is water and the magnesium salt is a water-soluble magnesium salt which includes, but is not limited to, acetates, nitrates, sulfates, chlorides or combinations thereof. In more preferred embodiment of the invention, the magnesium salt is magnesium sulfate.

Treatment of the catalyst particles may be accomplished by any conventional means known to one skilled in the arts. For example, treatment of the particles may be performed by contacting the catalyst particles with an aqueous solution of the magnesium salt in an amount sufficient to completely wet the particles and distribute magnesium oxide over the surface and into the pores of the catalyst particles. In a preferred embodiment of the invention, an aqueous magnesium salt containing solution is contacted with the catalyst particles in a manner sufficient to fill or substantially fill (i.e. at least 90%) the pores of the particles. In embodiment more preferred embodiment of the invention, magnesium oxide is distributed uniformly throughout the catalyst particles and pores using impregnation.

The amount of magnesium salt in the aqueous solution will vary depending upon the amount of magnesium oxide desired on the final catalyst composition. Generally, the amount of magnesium salt will be an amount sufficient to provide at least about 0.2 wt %, based on the total weight of the catalyst, of magnesium salt, expressed as the oxide, in the final catalyst. In one embodiment of the invention, the amount of magnesium in the aqueous solution will be an amount sufficient to provide at from about 0.2 wt % to about 5.0 wt %, based on the total weight of the catalyst, of magnesium salt, expressed as the oxide, in the final catalyst. In another embodiment of the invention, the amount of magnesium in the aqueous solution will be an amount sufficient to provide from about 0.5 wt % to about 3.0 wt %, based on the total weight of the catalyst, of magnesium salt, expressed as the oxide, in the final catalyst. In yet another embodiment of the invention, the amount of magnesium salt in the aqueous solution will be an amount sufficient to provide from about 0.8 wt % to about 2.0 wt %, based on the total weight of the catalyst, of magnesium salt, expressed as the oxide, in the final catalyst.

The magnesium salt containing particles are thereafter dried at about 100° C. to about 300° C. for about a second to about 2 hours to form high matrix surface area catalyst particles in accordance with the invention. The dried magnesium salt containing catalyst particles may optionally be calcined at a temperature ranging from about 300° C. to about 800° C.

The primary components of catalyst compositions of the present invention comprise a catalytically active zeolite, an acidified silica sol binder, clay, matrix material and magnesium salt.

It is further within the scope of the present invention that catalyst compositions of the invention may be used in combination with other catalysts and/or additives conventionally used in catalytic cracking process, in particularly FCC processes, e.g. $SO_x$ reduction additives, $NO_x$ reduction additives, gasoline sulfur reduction additives, CO combustion promoters, additives for the production of light olefins, and the like.

Cracking catalyst compositions of the invention are useful in conventional FCC processes or other catalytic cracking processes where hydrocarbon feedstocks are cracked into lower molecular weight compounds. Somewhat briefly, the FCC process involves the cracking of heavy hydrocarbon feedstocks to lighter products by contact of the feedstock in a cyclic catalyst recirculation cracking process with a circulating fluidizable catalytic cracking catalyst inventory consisting of particles having a mean particle size from about 45 to about 200 μm, preferably from about 55 μm to about 150 μm. The catalytic cracking of these relatively high molecular weight hydrocarbon feedstocks results in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is regenerated in a catalyst regeneration zone to produce hot, regenerated catalyst, which is then recycled to the cracking zone for cracking further quantities of feed.

Typical FCC processes are conducted at reaction temperatures of about 480° C. to about 700° C. with catalyst regeneration temperatures of about 600° C. to about 800° C. As it is well known in the art, the catalyst regeneration zone may consist of a single or multiple reactor vessels. The compositions of the invention may be used in FCC processing of any typical hydrocarbon feedstock. The amount of the composition of the invention used may vary depending on the specific FCC process. Typically, the amount of the catalyst composition used is at least 1.0 wt % of the total cracking catalyst inventory. In a preferred embodiment of the invention, the amount of the invention catalyst composition used in the total cracking catalyst inventory ranges from about 1.0 to about 100 wt % of the total catalyst inventory. When used as a blend with other FCC catalysts and/or additives, the catalyst compositions of the invention is preferably used in an amount ranging from about 15 wt % to about 85 wt % of the total cracking catalyst inventory.

Cracking catalyst compositions of the invention may be added to the circulating FCC catalyst inventory while the cracking process is underway or they may be present in the inventory at the start-up of the FCC operation. Alternatively, the catalyst particles may be added directly to the cracking zone, to the regeneration zone of the FCC cracking apparatus, or at any other suitable point in the FCC process.

As stated herein above, it is within the scope of the invention to use the cracking catalyst compositions of the invention alone or in combination with other conventional FCC catalysts which include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay. The Y zeolite may be present in one or more forms and may have been ultra stabilized and/or treated with stabilizing cations such as any of the rare earths. It is also within the scope of the present invention that the FCC catalyst comprises a phosphorous stabilized zeolite having catalytic cracking activity, e.g. phosphorous stabilized Y type zeolite.

Catalyst compositions in accordance with the invention may be used to crack any typical hydrocarbon feedstocks, including but not limited to, hydrotreated vacuum gas oils and non-hydrotreated vacuum gas oils. Cracking catalyst compositions of the invention are useful for cracking hydrocarbon feedstocks containing heavy resid petroleum feeds with typically higher boiling point distribution and higher Conradson carbon content as compared to typical gas oils.

Compositions of the invention offer the advantage of immediate cost savings in the preparation and use of FCC catalysts and increased catalytic activity and improved selectivity for coke and hydrogen during a FCC process. Catalysts of the invention eliminate the need for costly rare earth components to achieve a catalyst performance comparable to rare earth containing FCC catalyst compositions.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

An aqueous slurry containing USY zeolite, 1600 g (dry basis), was mixed with 2000 g (dry basis) of boehmite alumina. The mixture was then milled and combined with 3200 g (dry basis) of Natka clay and 1200 g (dry basis) of acidified silica sol and spray dried. The catalyst was then washed in an ammonia containing solution to remove excess sodium ions. The catalyst was dried at 120° C. Catalyst A was prepared by impregnating the dried catalyst with enough magnesium sulfate solution to achieve 1.8% magnesium oxide in the total catalyst. The properties of the catalyst are shown in Table 1.

Comparative Example 1

An aqueous slurry containing REUSY zeolite, 1600 g (dry basis), was mixed with 2000 g (dry basis) of boehmite alumina. The mixture was then milled and combined with 3200 g (dry basis) of Natka clay and 1200 g (dry basis) of acidified silica sol and spray dried. The catalyst was then washed in an ammonia containing solution to remove excess sodium ions. The catalyst was dried at 120° C. and is hereinafter identified as Comparative Catalyst 1. The properties of the catalyst are shown in Table 1 below.

TABLE 1

Chemical and Physical Properties of Mg Containing Catalyst and Rare Earth Containing Catalyst

|  | Catalyst A | Comparative Catalyst 1 |
| --- | --- | --- |
| $Na_2O$, wt % | 0.26 | 0.26 |
| $SO_4$, wt % | 5.48 | 1.70 |
| MgO, wt % | 1.81 | 0.04 |
| $RE_2O_3$, wt % | 0.02 | 1.38 |
| ZSA, $m^2/g$ | 107 | 142 |
| MSA, $m^2/g$ | 91 | 109 |
| CPS Deactivation | | |
| Ni ppm | 1130 | 1020 |
| V ppm | 2340 | 2210 |
| ZSA, $m^2/g$ | 47 | 79 |
| MSA, $m^2/g$ | 76 | 74 |

Example 2

A comparison of the performance of Catalyst A and Comparative Catalyst 1 was evaluated in an ACE Unit as follows: Catalyst A and Comparative Catalyst 1 were deactivated using a cyclic propylene steam protocol with 1000 ppm Ni+2000 ppm V. The properties of the fresh and steamed catalyst are shown in Table 1. The deactivated samples were evaluated in the ACE unit for activity and hydrocarbon selectivities. The interpolated hydrocarbon yields, for the 1.8% MgO catalysts with 0-20% added silica, are shown in Table 2 below.

TABLE 2

Interpolated ACE Results of Mg Containing Catalyst versus Rare Earth Containing Catalyst

|  | Catalyst A | Comparative Catalyst 1 |
| --- | --- | --- |
| Conversion | 69 | 69 |
| Cat-to-Oil Ratio (C/O) | 6.83 | 6.59 |
| Hydrogen, wt % | 0.41 | 0.57 |
| Total C3's, wt % | 4.64 | 4.45 |
| Total C4's, wt % | 9.12 | 8.68 |
| C5 + Gasoline, wt % | 48.38 | 48.40 |
| LCO, wt % | 23.50 | 23.95 |
| Bottoms, wt % | 7.37 | 6.94 |
| Coke, wt % | 4.90 | 5.49 |

As shown in Table 2, the magnesium containing, rare earth free catalyst in accordance with the present invention exhibited improved hydrogen and coke selectivity.

What is claimed is:

1. A fluid catalytic cracking catalyst having increased activity and improved selectivity for cracking of a hydrocarbon feedstock to lower molecular weight products, the catalyst comprising a particulate composition comprising a zeolite having catalytic cracking activity under fluid catalytic cracking conditions, a magnesium salt, clay, an acidified silica sol binder and a matrix material, wherein the composition has a matrix surface area of greater than 60 m$^2$/g, the magnesium salt is distributed throughout the particulate, and the composition is free of rare earth metals.

2. The catalyst of claim 1 wherein the zeolite is a faujasite zeolite.

3. The catalyst of claim 2 wherein the faujasite zeolite is a Y-type zeolite.

4. The catalyst of claim 1 wherein the matrix surface area is greater than 80 m$^2$/g.

5. The catalyst of claim 1 wherein the amount of zeolite present in the catalyst ranges from about 10 wt % to about 50 wt % of the total catalyst composition.

6. The catalyst of claim 5 wherein the amount of zeolite present in the catalyst ranges from about 12 wt % to about 40 wt % of the total catalyst composition.

7. The catalyst of claim 5 wherein the amount of binder present in the catalyst ranges from about 5 wt % to about 30 wt % of the catalyst composition.

8. The catalyst of claim 1 wherein the amount of binder present in the catalyst ranges from about 5 wt % to about 30 wt % of the catalyst composition.

9. The catalyst of claim 1 wherein clay is present in the composition in an amount ranging from about 5 wt % to about 65 wt % of the total catalyst composition.

10. The catalyst of claim 1 wherein the matrix material is selected from the group consisting of alumina, silica-alumina, zirconia, titania, and combinations thereof.

11. The catalyst of claim 10 wherein the matrix material is present in the composition in an amount ranging from about 1 wt % to about 70 wt % of the total catalyst composition.

12. The catalyst of claim 1 wherein the amount of magnesium salt present in the catalyst ranges from about 0.2 wt % to about 5.0 wt %, expressed as the oxide, based on the total catalyst composition.

13. A method of forming a catalytic cracking catalyst having a high matrix surface area, said method comprising a. forming an aqueous slurry comprising at least one zeolite particle having catalytic cracking activity under catalytic cracking conditions, an acidified silica sol binder, clay, and at least one matrix material;

b. spray drying the slurry to form catalyst particles;

c. washing the catalyst particles;

d. contacting the washed catalyst particles with an aqueous solution comprising at least one soluble magnesium salt in an amount sufficient to provide a particulate catalyst composition comprising at least about 0.2 wt % magnesium salt and having a matrix surface area of greater than 60 m$^2$/g;

e. removing the particles; and f. drying the catalyst particles to obtain final catalyst particles having a Davison Index (DI) of less than 30, wherein the particulate catalyst composition is free of rare earth metals.

14. The method of claim 13 wherein the aqueous slurry comprises zeolite particles in an amount sufficient to provide from about 10 wt % to about 50 wt % zeolite in the final catalyst composition.

15. The method of claim 13 wherein the zeolite particle is a faujasite zeolite.

16. The method of claim 13 wherein the binder is present in the slurry in an amount sufficient to provide at about 5 wt % to about 30 wt % binder in the final catalyst composition.

17. The method of claim 13 wherein the magnesium salt is selected from the group consisting of nitrates, acetates, sulfates, chlorides and combinations thereof.

18. The method of claim 13 wherein clay is present in the slurry in an amount sufficient to providing from about 5 wt % to about 65 wt % clay based on the total weight of the final catalyst composition.

19. The method of claim 13 wherein the matrix material is selected from the group consisting of alumina, silica-alumina, zirconia, titania, and combinations thereof.

20. The method of claim 19 wherein the matrix material is present in the slurry in an amount sufficient to provide from about 1 wt % to about 70 wt % in the final catalyst composition.

21. The method of claim 13 wherein the washed catalyst particles is contacted with an aqueous solution comprising at least one soluble magnesium salt in an amount sufficient to provide a particulate catalyst composition comprising from about 0.2 wt % to about 5.0 wt % magnesium salt, expressed as the oxide, based on the total weight of the final catalyst composition.

22. A method of catalytic cracking a hydrocarbon feedstock into lower molecular weight components, said method comprising contacting a hydrocarbon feedstock with a cracking catalyst at elevated temperature whereby lower molecular weight hydrocarbon components are formed, said cracking catalyst comprising the composition of claim 1.

23. The method of claim 22 wherein the zeolite is a faujasite zeolite.

24. The method of claim 23 wherein the zeolite is a Y type zeolite.

25. The method of claim 22 further comprising recovering the cracking catalyst from said contacting step and treating the used catalyst in a regeneration zone to regenerate said catalyst.

26. The method of claim 22 wherein the amount of magnesium salt in the aqueous solution is an amount sufficient to provide from about 0.2 wt % to about 5.0 wt % magnesium salt, expressed as the oxide, based on the total weight of the final catalyst composition.

* * * * *